United States Patent [19]

Weaver

[11] E Patent Number: Re. 33,757

[45] Reissued Date of Patent: Dec. 3, 1991

[54] DIAMOND DRILL BIT WITH VARIED CUTTING ELEMENTS

[75] Inventor: Gary E. Weaver, Conroe, Tex.

[73] Assignee: Dresser Industries, Inc., Dallas, Tex.

[21] Appl. No.: 484,510

[22] Filed: Feb. 23, 1990

Related U.S. Patent Documents

Reissue of:

[64] Patent No.: 4,602,691
Issued: Jul. 29, 1986
Appl. No.: 618,113
Filed: Jun. 7, 1984

[51] Int. Cl.[5] ..... E21B 10/50

[52] U.S. Cl. ..... 175/329; 175/410

[58] Field of Search ..... 175/329, 330, 410

[56] References Cited

U.S. PATENT DOCUMENTS

| | | | |
|---|---|---|---|
| 3,709,308 | 1/1973 | Rowley et al. | 175/329 |
| 3,747,699 | 7/1973 | Feenstra | 175/329 |
| 3,825,083 | 7/1974 | Flarity et al. | 175/329 X |
| 3,938,599 | 2/1976 | Horn | 175/329 |
| 4,098,363 | 7/1978 | Rohde | 175/329 |
| 4,109,737 | 8/1978 | Bovenkerk | 175/329 |
| 4,225,322 | 9/1980 | Knemeyer | 51/295 |

FOREIGN PATENT DOCUMENTS 2086451 5/1982 United Kingdom .

*Primary Examiner*—Thuy M. Bui
*Attorney, Agent, or Firm*—Johnson & Gibbs

[57] ABSTRACT

An earth boring bit utilizing thermally stable polycrystalline diamond material having a row of closely spaced sharp cutting elements, following by a row of widely spaced, blunt or rounded cutting elements, each cutting element extending from a supporting matrix a predetermined amount to allow the sharp cutting elements to form small relief kerfs in a geological formation, after which the blunt or rounded cutting elements dislodge material between the kerfs. Additionally, cylindrical cutting elements are positioned near the gage or outermost portion of the matrix to enhance gage bore cutting.

4 Claims, 1 Drawing Sheet

Fig. 1
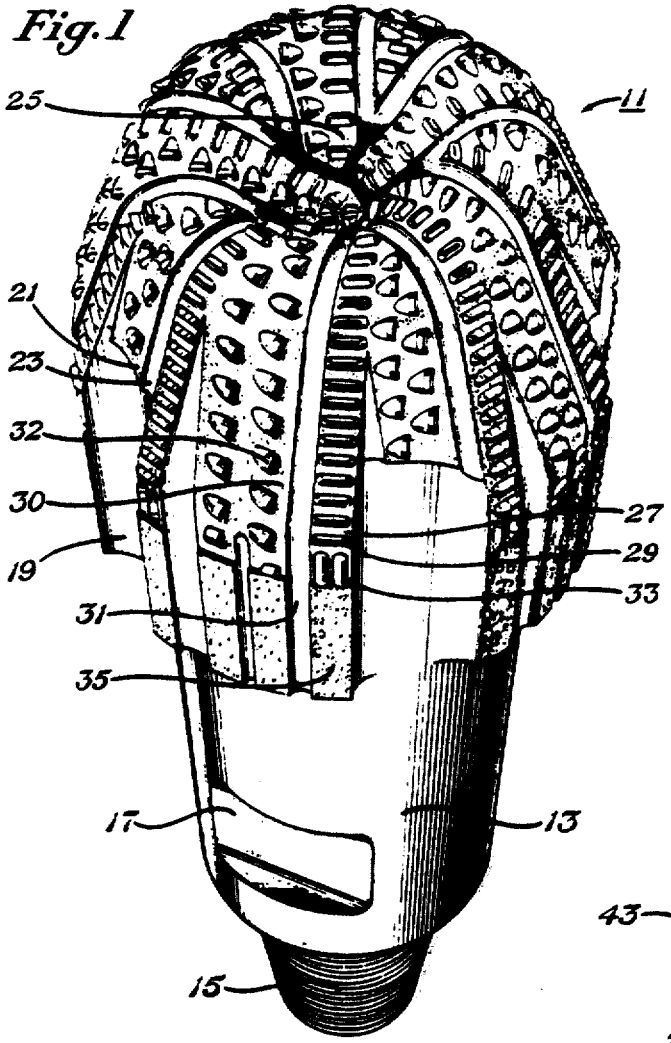
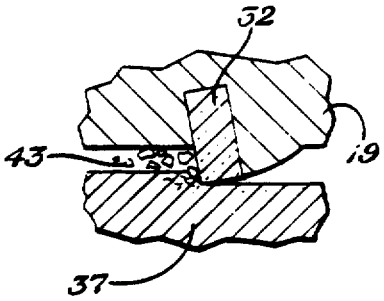
Fig. 3
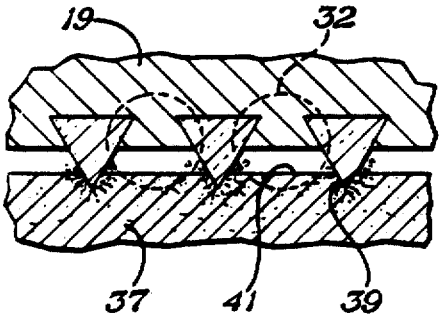
Fig. 2

DIAMOND DRILL BIT WITH VARIED CUTTING ELEMENTS

Matter enclosed in heavy brackets [ ] appears in the original patent but forms no part of this reissue specification; matter printed in italics indicates the additions made by reissue.

BACKGROUND INFORMATION

1. Field of the Invention

This invention relates in general to earth boring bits, particularly to those utilizing diamonds for cutting elements used to disintegrate geological formations.

2. Background Information

The commercially viable earth boring bits may be classified into rolling cutter bits, having either steel teeth or tungsten carbide inserts, and diamond bits, which utilize either natural diamonds or artificial or man-made diamonds. The artificial diamond is polycrystalline, and is used individually or as a component of a composite compact or insert on a cemented tungsten carbide substrate. Recently, a new artificial, polycrystalline diamond has been developed which is stable at higher temperatures than the previously known polycrystalline diamond. The higher temperature stability is advantageous in increasing the life of the diamonds during drilling.

SUMMARY OF THE INVENTION

It is the general object of the invention to provide an earth boring drill bit having thermally stable polycrystalline diamond with varied shapes in an arrangement to enhance drilling, especially in those geological formations classified as medium-soft to medium.

Accordingly, an earth boring drill bit is provided having a body and threaded connection for attachment to a drill string member on one end, a matrix formed on the opposite end, a row of closely spaced, sharp cutting elements placed directly in front of a row of rounded or blunt cutting elements, each being formed of a thermally stable polycrystalline diamond material, the cutting elements allowing the sharp cutters to cut small relief kerfs in the formation, after which the blunt cutting element follow to dislodge formation between kerfs.

The above as well as additional objects, features and advantages of the invention will become apparent in the following description.

DESCRIPTION OF THE FIGURES OF THE DRAWING

FIG. 1 is a perspective view as seen looking obliquely and downwardly upon an earth boring bit embodying the principles of my invention.

FIG. 2 is a schematic representation of a cutting element formed of thermally stable polycrystalline diamond, arranged to engage the geological formations during drilling in accordance with my invention.

FIG. 3 is a fragmentary side view of the preferred cutting elements embodied in a matrix and engaging a formation in the preferred pattern.

DESCRIPTION OF THE PREFERRED EMBODIMENT

The numeral 11 in the drawing designates an earth boring bit having a body 13 with threads 15 formed on one end for connection with a drill string member (not shown). The body 13 further includes a pair of wrench flats 17 used to apply the appropriate torque to properly "make-up" the threads 15.

On the opposite end of the body 13 (normally the lower end during drilling) there is a matrix 19 in a predetermined configuration to include a plurality of radially extending lands 21 and water courses 23 that radiate from a central water course or passage which terminates between the ends 25 of the lands 21.

On some lands 27 of relatively narrow width are disposed a row of closely spaced sharp cutting elements 29, which lead in the direction of rotation of the bit, one of the water courses 31 which is ahead of the wider lands 30. On the wider lands are two rows of blunt cutting elements 32, which converge near the central water course into a single row, as indicated in FIG. 1. Cylindrical shaped inserts 33 are positioned at the outermost or gage portion 35 of the bit, as also indicated in FIG. 1, to extend from the matrix 19 longitudinally of the rotational axis of the bit. Additional wear resistant materials such as smaller particles of artificial diamonds are flush set in the matrix in the gage portion 35.

As indicated in FIG. 2, the above configuration results in the protrusion from the matrix 19 of sharp cutting elements 29, which are directly before and between each row of blunt cutting elements, designated by the numeral 32. Thus, there is formed in the geological formation 37 a series of kerfs or grooves 39, leaving kerf portions 41 which are in turn cut by the blunt cutting elements 32 during drilling.

As indicated in FIG. 3, the arrangement and configuration of cutting elements illustrated in FIGS. 1 & 2 enables a blunt cutting element 32, extending from the matrix 19, to disintegrate the earth formation 37 and form cuttings 43.

The matrix 19 has a composition of the same type used in conventional diamond bits, one example being that which is disclosed in the U.S. Patent of David S. Rowley, U.S. Pat. No. 3,175,629, Mar. 30, 1965. Generally, such matrices may be classified as a cooper-nickel alloy containing powdered tungsten carbide.

The sharp cutting elements 29 and the blunt cutting elements 32 are preferably temperature stable polycrystalline, artificial diamond currently being sold by General Electric Company under the "GeoSet" trademark. The sharp cutters 29 in the preferred embodiment are equilateral triangles measuring about 0.135 inch from the base to the apex, and protrude about 0.085 inch from the matrix 19. The blunt cutters 31 are circular, having a diameter of about 0.200 inch, protruding about 0.080 inch from the matrix. The thickness of both the blunt and sharp cutter is about 0.110 inch. Both the sharp and the blunt cutters have a negative back rake angle of about 10 degrees and a side rake angle of about 15 degrees. The cylindrical gage inserts 33 have the same composition as the sharp and blunt cutters, being about 0.110 inch in diameter and 0.375 inch long, protruding about 0.035 inch from the matrix.

It should be apparent from the foregoing I have provided an invention having significant advantages. The utilization of preferably thermally stable polycrystalline diamond materials in varied shapes and sizes such as the preferred combination of sharp and blunt cutting element illustrated in drawing, enables especially successful removal of the medium-soft to medium formations that behave in a brittle manner. This configuration allows the sharp cutting elements to cut small relief kerfs in the formation, after which the round or blunt cutters follow and dislodge the formation between the kerfs. This provides for larger cuttings to be generated, producing increased cutting efficiency while reducing the rate of wear. As a result, earth boring operations are enhanced by increases in drilling rates and reductions in costs. Further, the use of cylindrical shaped inserts at the gage provides increase cutting with line contact plus the self sharpening ability of polycrystalline diamonds.

While I have shown my invention in only its preferred form, it should be apparent that it is not thus limited, but is susceptible to various changes and modifications without departing from the principles thereof.

I claim:

1. An earth boring bit which comprises in combination:

a body having one end that includes means for connection to a drill string member;

matrix material formed on the opposite end to have alternate radially extending lands extending to an outermost gage portion and radially extending water courses;

at least one row of polygon shaped, polycrystalline diamond cutting elements extending [a predetermined distance] *about 0.085 inch* from the matrix material into an apex to form relief kerfs in *a* geological formation during drilling;

*one of the water courses being positioned immediately behind the row of diamond cutting elements;* a plurality of generally blunt cutting elements positioned in a row to extend from the matrix [a predetermined distance] *about 0.080 inch* and follow in between the apexes of the cutting elements to dislodge formation between the kerfs.

[2. The invention defined by claim 1 wherein a water course is positioned immediately behind the row of relatively sharp cutting elements, with the apexes of the cutting elements extending about 0.085 inch from the matrix material and the blunt cutters extending therefrom about 0.080 inch.]

3. The invention defined by claim [2] *1* wherein the blunt cutting elements are positioned in two rows near the gage portion of the matrix and converge to a single row at the innermost portion of the bit at the ends of the lands and water courses.

4. The invention defined by claim 3 wherein at the gage of the bit there extends from the matrix a plurality of cylindrical cutting elements, which extend longitudinally to enhance gage cutting and protrude outwardly from the matrix.

*5. An earth boring bit which comprises in combination:*

*a body having one end that includes means for connection to a drill string member;*

*matrix material formed on the opposite end to have alternate, radially extending lands to an outermost gage portion and radially extending water courses;*

*at least one row of polygon shaped, polycrystalline diamond cutting elements extending a predetermined distance from the matrix into an apex, the apex of each cutting element being arranged generally normal to the matrix to form relief kerfs in geological formation during drilling;*

*a plurality of generally blunt cutting elements positioned in a row to extend from the matrix a predetermined distance and follow in between the apexes of the cutting elements to dislodge formation between the kerfs.*

* * * * *